May 20, 1958   G. L. MITTELSTEADT   2,835,077
GOOSE CALLS
Filed July 9, 1956

INVENTOR.
Glen J. Mittelsteadt

United States Patent Office 2,835,077
Patented May 20, 1958

2,835,077

GOOSE CALLS

Glen L. Mittelsteadt, Waseca, Minn., assignor to Herter's, Inc., Waseca, Minn., a corporation of Minnesota Application July 9, 1956, Serial No. 596,695

1 Claim. (Cl. 46—180)

My present invention relates, broadly, to the art of manufacturing game calls and particularly to a goose call, the novel construction of which affords a call that is easier to blow and which produces an extremely natural and life-like mimic of the goose call.

The principal object of my present invention is to produce a goose call that breaks into the two-noted call of the goose much easier and with less experience than has heretofore been necessary with calls previously known and used.

Another object of the invention is to produce a goose call which is very easy to blow and which will respond to the slightest air pressure, thus making it much easier to produce the highly desired "chuckle" of a goose.

A still further object of my invention is to produce a goose call which, by virtue of its novel internal structure, eliminates the tendency of other calls to "slug up", or stop entirely, and instead produce an equalizing effect upon the air pressure developed within the body of the call as it escapes therefrom under the reed with a minimum of vibration.

These and other objects of the invention will be apparent from the following specification, claim and appended drawings, wherein like characters indicate like parts throughout the several views.

Referring to the drawings.

Figure 1:
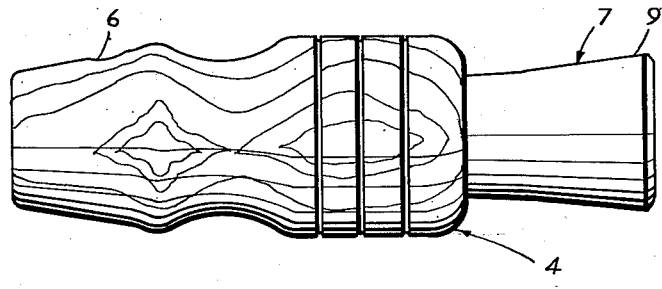
Fig. 1 is a side elevational view of the assembled goose call.
Figure 2:
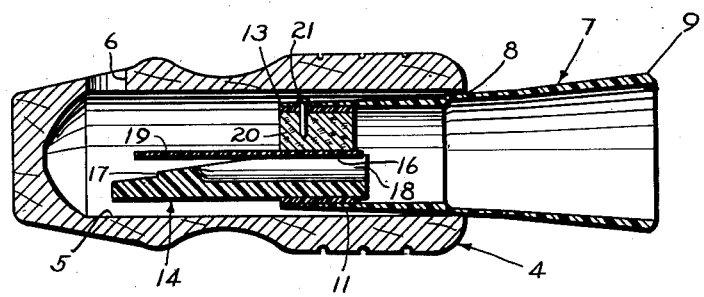
Fig. 2 is a sectional view of the goose call in side elevation taken of Fig. 1.
Figure 3:
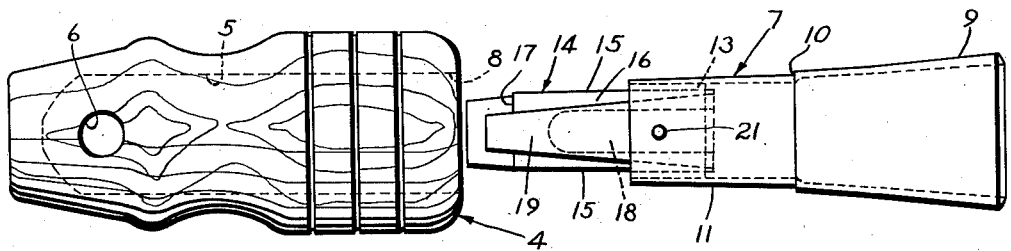
Fig. 3 is a top plan view showing the stopper assembly withdrawn from the call barrel or tubular body portion, some parts being shown by means of broken lines.

As shown in the accompanying drawing, the numeral 4 indicates a tubular body or barrel portion longitudinally centrally being somewhat constricted and thence tapered to its inner end portion a relatively deep central bore 5 extends longitudinally inwardly from the outer end portion of the body member or barrel 4 to form a sound chamber, the inner end portion of which is slightly rounded or cupped. A novel mouthpiece by which air is introduced to the sounding chamber is provided by a transverse bore 6 which is in communication with the inner end portion of the chamber 5.

A stopper member 7 is constructed and designed to be removably inserted into the mouth 8 of the chamber 5 and engages said mouth 8 of the chamber 5 at its central portion with a relatively tight wedgelike fit which continues to flare outwardly and thus terminates the outer end portion of the stopper member 5 in the form of a bell 9 through which sounds produced within the chamber 5 are emitted to the atmosphere. An annular shoulder 10 is formed substantially at the longitudinal center of the stopper member 5, reduces the diameter of the inner end portion 11 of the stopper 5 and thus spaces said inner end portion 11 and the sounding components mounted therein transversely away from the inner walls of the sound chamber 5. The stopper parts thus far described constitute an integral construction preferably made of a moistureproof plastic material in order to avoid the disadvantages common to wood or other moisture-absorbing material used in these parts, wherein the swelling and drying out process thereof tends to cause fluctuation in the tone of the sounding device.

The stopper member 7 has a relatively large axially disposed bore extending therethrough to form an air passageway except as restricted by the sounding components, as will presently be described.

A relatively wide annular ring 13 also of plastic material is longitudinally disposed and mounted in the inner end portion 11 of the stopper member 7 with a tight working fit to facilitate assembly and tuning of the sounding components relative to the stopper member 7, as well as to strengthen the assembly at this point and permit easy and quick replacement of the only possible wearing parts of the device.

Removably applicable to the annular ring 13 is a relatively long inwardly projecting tongue-like member 14 substantially semicircular in cross-section at its outer end portion where it engages the annular ring 13. These as mounted, said tongue-like member maintains substantially parallel sides 15 and its upper flat surface 16 tapers downwardly and inwardly to a point near its inner end portion, wherein a transversely disposed step shoulder 17 is formed in the same, said tapered upper flat portion 16 thence continuing to the end thereof and the sides 15 inwardly of the shoulder 17 converging slightly to the end portion of said member 14. A longitudinally disposed groove 18 also substantially semi-circular in cross-section is formed in the upper flat surface 16 of the member 14 and extends from its outer end portion inwardly to the desired point adjacent the transverse shoulder 17 to form an air chamber.

A metallic reed 19 of such thickness as to assure the desired vibration for producing sound overlies the upper flat surface 16 of the member 14 from the outer end portion thereof inwardly to a point slightly beyond the shoulder 17. The tongue-like member 14 and the reed 19 are held tightly in properly toned position relative to the annular ring 13 by wedging the said member between the inner surfaces of the ring 13 by means of a resilient wedge 20 of material such as cork and is substantially semicircular.

The member 14 is placed within the ring 13 in the lower one-half portion thereof with its outer end portion substantially in endwise vertical alignment with the outer edge portion of the ring member 13, and the reed member 19 is mounted thereon with its outer end also in alignment as above. The wedge-like member 20 is thence inserted into the upper one-half portion of the ring 13 with a very tight pressed fit, thus holding in rigid alignment against the inner surface of the ring member 13 the tongue-like member 14 and the reed 19, the latter overlying the former as heretofore described.

A small pin or stud 21 extends in transverse aligned bores in the stopper member at the inner end portion 11 thereof and the wedge-like member 20 thus affording a marker to facilitate alignment of the members 4 and 7 relative to the transverse mouthpiece bore 6 and to lock the assembled members 14—19 and 20 against endwise and axial movement relative to the stopper member 7.

It will readily be seen that this call differs widely from the conventional call of this type in that in using the call, the operator blows down directly into the reed 19 projected into the member or barrel portion 4 instead of through an axially aligned mouthpiece which has a tendency to impair or stop altogether the sounds emitted by sound members 14—19. Air blown down into the tip of the reed 19 can only escape under the said reed, thus making the call blow much easier and even the slightest breath of air directed downwardly into the chamber 5 through the mouthpiece 6 causes the said sounding members to vibrate and produce the highly desirable two-noted tone of a natural goose call. Heretofore, only an expert caller after much practice has been able to simulate this call.

The turbulence of the air stream directed downwardly onto the tip of the reed, the tapered tongue-like member 14 and the longitudinal groove 18 therein over which the reed 19 is mounted and caused to vibrate by the passage of air between the said reed and groove 18 in the member 14 in its sole escape to atmosphere, constitute a novel arrangement and produces a result that is highly sought for in the art of goose calling.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claim as are stated herein or required by the prior art.

What I claim is:

A wind sounding device of the class described, comprising in combination, a body member, a longitudinally disposed chamber in said body member, one end portion of the chamber being open to atmosphere in the form of a relatively wide open mouth and the other end portion thereof being closed, a relatively small port affording a mouthpiece in the longitudinal side portion of the body member at the closed end portion thereof said port extending transversely through said body member to afford an air intake port having communication with said chamber, a stopper member, the inner end portion of which is cylindrical and extends into the chamber in said body member, the outer end portion of said stopper member extending outwardly of the wide open end portion of the body member, a relatively large bore in said stopper member extending therethrough, a relatively wide sleeve having a tight working fit with the inner end portion of the stopper member, adjustable means mounted in the inner end portion of the stopper member comprising a relatively long tongue-like member, the outer end portion of which is semicircular in cross-section, and the inner end portion thereof being downwardly inclined on its flat upper and its longitudinal edge portions being substantially parallel except at their extreme inner end portions which are in slightly converging relation outwardly of a point formed by a shoulder forming a part of the inner end portion of the tongue-like member to abruptly increase the downward inclination of the said flat upper side portion, a longitudinally disposed groove in said flat upper side portion of said tongue-like member said groove being closed at its inner end portion and open at its outer end, an inwardly tapered vibrating reed member mounted in the stopper and overlying the said tongue-like member and the groove formed therein, resilient means insertable between the tongue-like member and its mounted vibrating reed inside the inner end portion of the stopper member thus holding the tongue-like member and its mounted vibrating reed in properly adjusted and toned relation and restricting all passage of air to atmosphere through the said groove to activate the same, said stopper member and its mounted wind sounding components projecting into the said chamber in the body member to a point wherein the inner end portions of said sounding members are substantially in transverse alignment with the air intake port, whereby the turbulence set up in the chamber by air being forced through the intake port acts directly upon the inclined plane of the tongue-like member and its mounted vibrating reed in the direct airstream, produces a two-noted tone.

References Cited in the file of this patent

UNITED STATES PATENTS

| | | |
|---|---|---|
| 751,153 | Eisenstein | Feb. 2, 1904 |
| 2,518,616 | Herter | Aug. 15, 1950 |
| 2,651,141 | Bicocchi | Sept. 8, 1953 |